United States Patent
Lee

(10) Patent No.: US 12,220,964 B2
(45) Date of Patent: Feb. 11, 2025

(54) PIN CLUTCH SWAY BAR DISCONNECT

(71) Applicant: Schaeffler Technologies AG & Co. KG, Herzogenaurach (DE)

(72) Inventor: Brian Lee, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/105,788

(22) Filed: Feb. 3, 2023

(65) Prior Publication Data

US 2024/0262155 A1    Aug. 8, 2024

(51) Int. Cl.
*B60G 21/055* (2006.01)
(52) U.S. Cl.
CPC .... *B60G 21/0556* (2013.01); *B60G 2202/135* (2013.01); *B60G 2202/42* (2013.01)
(58) Field of Classification Search
CPC .............. B60G 21/055; B60G 21/0556; B60G 2202/135; B60G 2202/42; B60G 2202/422
See application file for complete search history.

(56) References Cited

U.S. PATENT DOCUMENTS

| | | | | |
|---|---|---|---|---|
| 9,303,699 | B2 * | 4/2016 | Kimes .................. | F16D 41/125 |
| 2008/0277891 | A1 | 11/2008 | Adams, III et al. | |
| 2009/0058020 | A1 * | 3/2009 | Ersoy ................. | B60G 21/0556 |
| | | | | 280/5.511 |
| 2022/0144037 | A1 * | 5/2022 | Rosinski ............ | B60G 17/0162 |
| 2023/0143681 | A1 * | 5/2023 | Cao ...................... | B60K 17/348 |
| | | | | 475/160 |

FOREIGN PATENT DOCUMENTS

DE    202018002699 U1 *   8/2018   .......... B60G 21/055
DE    102017105095 A1      9/2018

OTHER PUBLICATIONS

Description Translation for DE 202018002699 from Espacenet (Year: 2018).*

* cited by examiner

*Primary Examiner* — Jason D Shanske
*Assistant Examiner* — Daniel M. Keck
(74) *Attorney, Agent, or Firm* — Davidson Kappel LLC

(57) ABSTRACT

A sway bar disconnect assembly for a motor vehicle includes a first bar segment for being connected to a first wheel, a second bar segment for being connected to a second wheel, and a disconnect clutch configured for being selectively movable between a connect orientation in which the disconnect clutch non-rotatably fixes the first bar segment and the second bar segment together and a disconnect orientation in which the disconnect clutch rotationally decouples the first bar segment and the second bar segment from each other. The disconnect clutch includes a first clutch section non-rotatably fixed to the first bar segment and a second clutch section non-rotatably fixed to the second bar segment. The first clutch section includes axially displaceable male connectors and the second clutch section includes female connectors shaped for receiving the male connectors in the connect orientation. The disconnect clutch also includes an axially movable disconnector configured for axially contacting the male connectors, and an actuator configured for axially moving the disconnector to force the male connectors out of engagement with the female connectors causing the disconnect clutch to enter into the disconnect orientation.

20 Claims, 5 Drawing Sheets

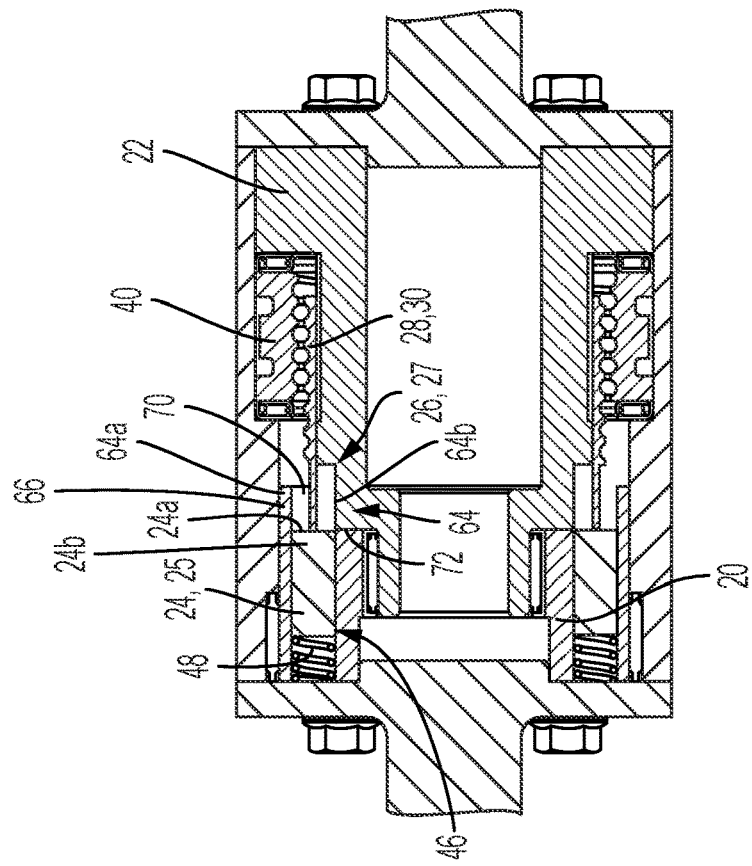
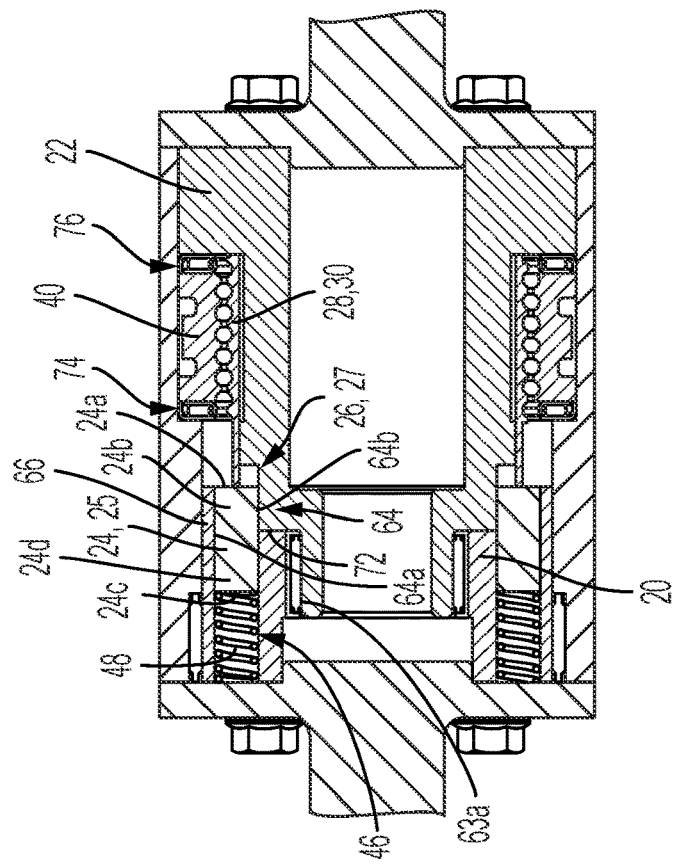
FIG. 4A
FIG. 4B

PIN CLUTCH SWAY BAR DISCONNECT

The present disclosure relates generally to sway bars of motor vehicles, and specifically to sway bar disconnects of trucks and sports utility vehicles.

BACKGROUND

Vehicles designed to operate both on-road and off can have a stabilizer bar to improve on-road cornering performance but which is disconnected for off-road extreme suspension travel.

SUMMARY

A sway bar disconnect assembly for a motor vehicle includes a first bar segment for being connected to a first wheel, a second bar segment for being connected to a second wheel, and a disconnect clutch configured for being selectively movable between a connect orientation in which the disconnect clutch non-rotatably fixes the first bar segment and the second bar segment together and a disconnect orientation in which the disconnect clutch rotationally decouples the first bar segment and the second bar segment from each other. The disconnect clutch includes a first clutch section non-rotatably fixed to the first bar segment and a second clutch section non-rotatably fixed to the second bar segment. The first clutch section includes axially displaceable male connectors and the second clutch section includes female connectors shaped for receiving the male connectors in the connect orientation. The disconnect clutch also includes an axially movable disconnector configured for axially contacting the male connectors, and an actuator configured for axially moving the disconnector to force the male connectors out of engagement with the female connectors causing the disconnect clutch to enter into the disconnect orientation.

BRIEF DESCRIPTION OF THE DRAWINGS

The present disclosure is described below by reference to the following drawings, in which:

FIG. 4a shows a radially facing cross-sectional view of the disconnect clutch, circumferentially offset from the view shown in FIG. 2, with the disconnect clutch in the connect orientation;

FIG. 4b shows the same radially facing cross-sectional view of the disconnect clutch as in FIG. 4a, but with the disconnect clutch in the disconnect orientation.

DETAILED DESCRIPTION

Figure 1A:
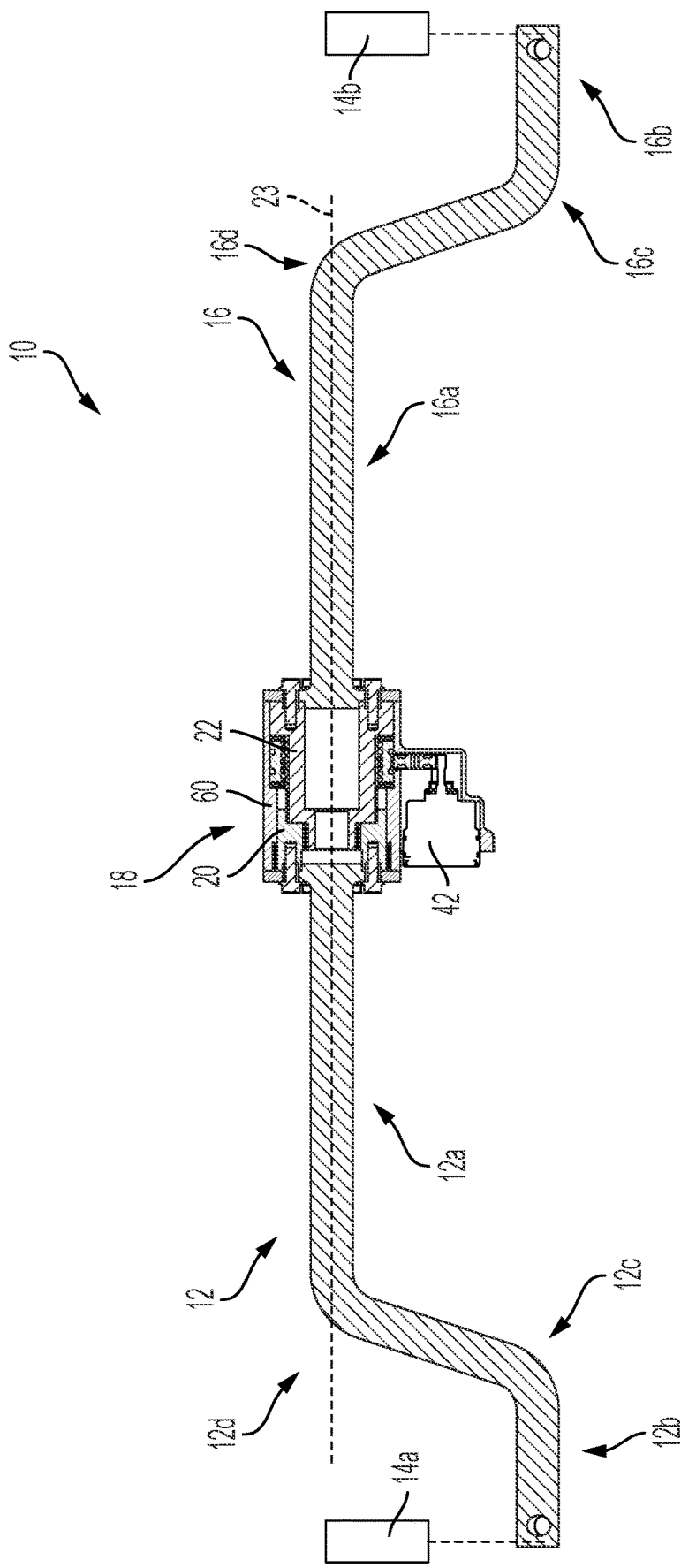
FIG. 1a shows a radially facing cross-sectional view of a sway bar disconnect assembly for a motor vehicle.
Figure 1B:
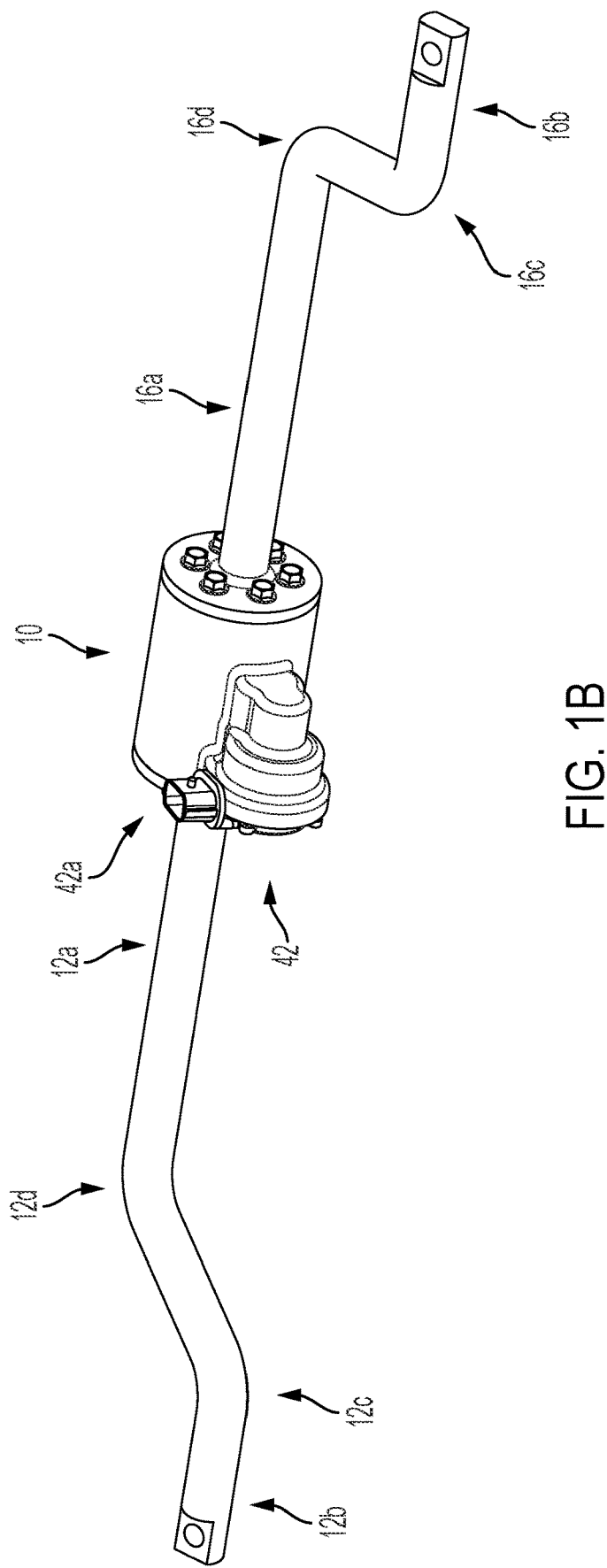
FIG. 1b shows a perspective view of the sway bar disconnect assembly.

FIGS. 1a and 1b show different views of a sway bar disconnect assembly 10 for a motor vehicle. Sway bar disconnect assembly 10 includes a first bar segment 12 for being connected to a first wheel 14a of the motor vehicle and a second bar segment 16 for being connected to a second wheel 14b of the motor vehicle. For example, the motor vehicle can be a truck or a sport utility vehicle. Sway bar disconnect assembly 10 further includes a disconnect clutch 18 configured for being selectively movable between a connect orientation in which the disconnect clutch 18 non-rotatably fixes the first bar segment 12 and the second bar segment 16 together and a disconnect orientation in which the disconnect clutch 18 rotationally decouples the first bar segment 12 and the second bar segment 16 from each other.

The disconnect clutch 18 includes a first clutch section 20 non-rotatably fixed to the first bar segment 12, and a second clutch section 22 non-rotatably fixed to the second bar segment 16. First clutch section 20 and second clutch section 22 are rotatable about a first axis 23, which in turn causes first bar segment 12 and second bar segment 16 to be rotatable about first axis 23. Unless otherwise specified herein, the terms axial, radial and circumferential and derivatives thereof are defined in reference to first axis 23. First bar segment 12 and second bar segment 16 each include a respective first end section 12a, 16a connected to disconnect clutch 18, a respective second end section 12b, 16b for connecting to the respective wheel 14a, 14b and two respective bends 12c, 12d, 16c, 16d causing first end section 12a to be radially offset from second end section 12b and first end section 16a to be radially offset from second end section 16b. First end section 12a and first end section 16a are arranged coaxially with first axis 23 such that second end section 12b and second end section 16b are radially offset from first axis 23.

Figure 3:
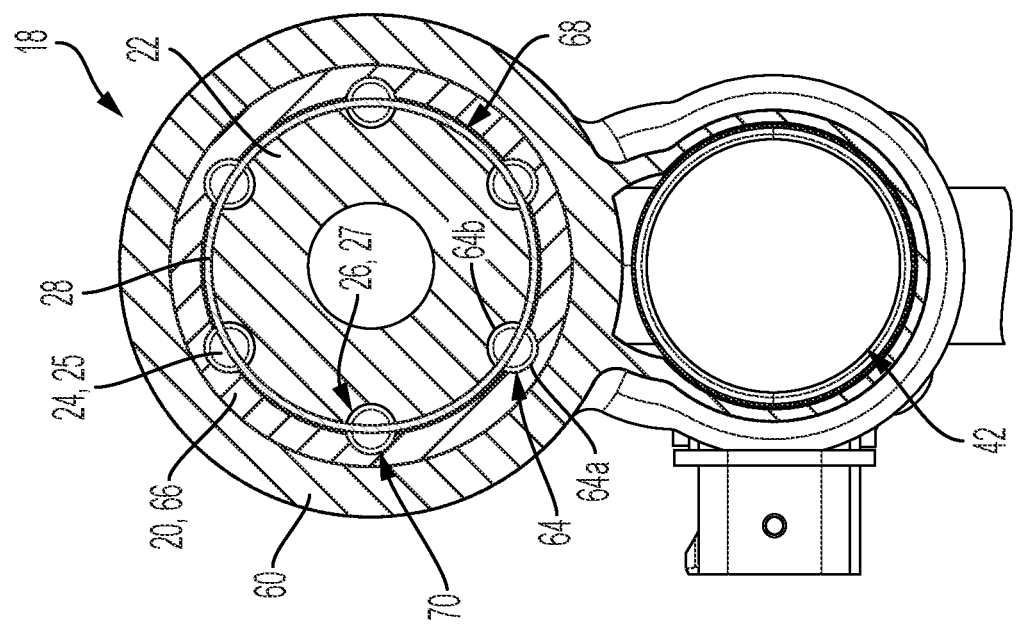
FIG. 3 shows an axially facing cross-sectional view of the disconnect clutch along A-A in FIG. 2.
Figure 5:
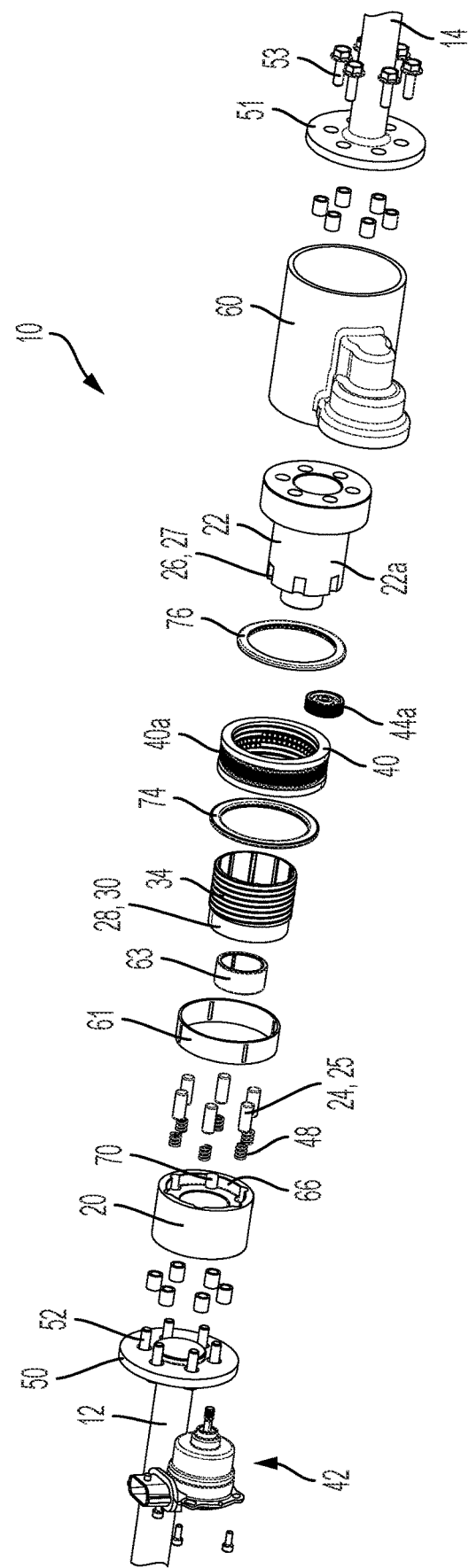
FIG. 5 shows an exploded view of the sway bar disconnect assembly.

As shown in more detail in FIGS. 3 to 5, the first clutch section 20 includes axially displaceable male connectors 24 and the second clutch section includes female connectors 26 shaped for receiving the male connectors 24 in the connect orientation. The male connectors 24 can be pins 25 and the female connectors 26 can be receptacles 27 defining slots shaped for receiving pins 25. Receptacles 27 intersect an outer circumferential surface 22a of the second clutch section 22.

The disconnect clutch 18 also includes an axially movable disconnector 28 configured for axially contacting a first end surface 24a on a first end 24b of each of the male connectors 24. The disconnector is axially slidable along and an outer circumferential surface 22a of the second clutch section 22. The disconnector 28 can be a first sleeve 30 of a screw 32 including a first helical groove 34 for receiving balls 36 of the all screw 32.

The disconnect clutch 18 further includes an actuator 38 configured for axially moving the disconnector 28 to force the male connectors 24 out of engagement with the female connectors 26 causing the disconnect clutch 18 to move from the connect orientation, as shown in FIG. 4a, into the disconnect orientation, as shown in FIG. 4b. The actuator 38 includes a second sleeve 40 of the screw 32, which includes a second helical groove 41 for receiving the balls 36 between the first sleeve 30 and the second sleeve 40.

Actuator 38 also includes an electric motor 42 for driving the second sleeve 40 to axially move the first sleeve 30. Actuator 38 further includes the actuator includes at least one gear 44a, 44b transmitting torque from the electric motor 42 to the second sleeve 40. The second sleeve 40 is fixed axially in place and the electric motor 42 is configured for rotating the second sleeve 40 in a first rotational direction to move the first sleeve 30 toward the male connectors 24 and for rotating the second sleeve 40 in a second rotational direction to move the first sleeve 30 away from the male connectors 24.

First clutch section 20 includes a plurality of bores 46. Each of the bores 46 includes a spring 48 and a respective one of the male connectors 24. Each spring 48 biases the respective male connector 24 toward the disconnector 28. Actuator 38 is configured for axially moving the disconnector 28 in a first axial direction to force the male connectors 24 into the respective springs 48 to compress the springs 48, and configured for moving the disconnector 28 in a second axial direction opposite of the first axial direction such that the springs 48 expand to force the first ends 24b of the male connectors 24 out of the bores 46.

First bar segment 12 includes a first flange plate 50 fixed to an end thereof. The first flange plate 50 is fixed to the first clutch section 20 by fasteners 52 passing through first flange plate 50 and into first clutch section 20. Springs 48 abut the first flange plate 50 and are sandwiched axially between the first flange plate 50 and the male connectors 24, with springs 48 contacting a second end surface 24c on a second end 24d of male connectors 24. The second clutch section 22 includes a second flange plate 51 fixed to an end thereof. The second flange plate 51 is fixed to the second clutch section 22 by fasteners 53 passing through second flange plate 51 and into second clutch section 22.

The electric motor 42 includes an output shaft 56 rotatable about a second axis 58 that is radially offset from and parallel with the first axis 23. A first gear 44a is non-rotatably fixed to output shaft 56 and drivingly engages a second gear 44b, which in turn drivingly engages teeth 40a of second sleeve 40 to rotate second sleeve 40 about second axis 58. The rotation of second sleeve 40 about second axis 58 is transferred via balls 36 to first sleeve 30, causing first sleeve 30 to move axially.

Sway bar disconnect assembly 10 further includes a housing 60 radially enclosing the first clutch section 20, the second clutch section 22, the disconnector 28 and at least a portion of the electric motor 42. Housing 60 further radially encloses output shaft 56, first gear 44a, second gear 44b and second sleeve 40. The first bar segment 12 is rotatable with respect to the housing 60 about the first axis 23 due to first clutch section 20 being rotatably supported in housing 60 by a bearing 61 on an outer circumferential surface 20b of first clutch section 20. Electric motor 42 includes a connection port 42a extending outside of housing for connecting to cables for providing power to electric motor 42 and/or signals for controlling electric motor 42.

Disconnect clutch 18 includes a bearing 62 on an inner circumferential surface 20a of the first clutch section 20 and an outer circumferential surface 63a of an end section 63 of the second clutch section 22, which is stepped radially inward of outer circumferential surface 22a. End section 63 is supported radially inside the bearing 62 for rotatably supporting first clutch section 20 with respect to second clutch section 22 and likewise rotatably supporting the second bar segment 16 with respect to the first bar segment 12.

Figure 2:
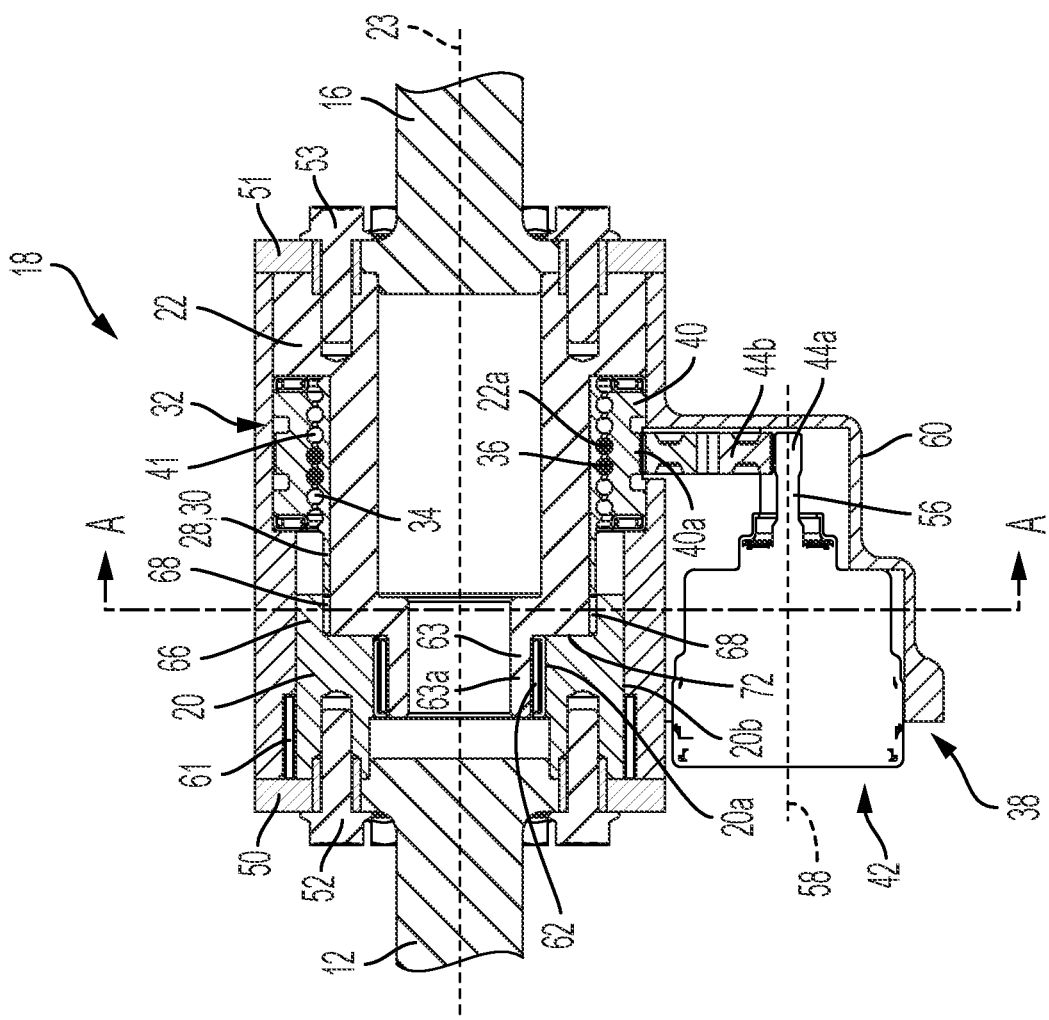
FIG. 2 shows a radially facing cross-sectional view of a disconnect clutch of the sway bar disconnect assembly.

The male connectors 24 non-rotatably connect the first clutch section 20 and the second clutch section 22 together when first end 24b of each of the male connectors 24 is in a respective transmission bore 64, as shown in FIG. 4a. As shown by viewing FIGS. 3, 4a and 4b together, each transmission bore 64 is defined by a transmission portion 66 of the first clutch section 20 and one of the female connectors 26. The transmission portion 66 defines an outer circumference 64a of each of the transmission bores 64 and each of the female connectors 26 defines an inner circumference 64b of each of the transmission bores 64. The disconnect clutch 18 is configured such that the disconnector 28 enters an annular space 68 (FIGS. 2 and 3) radially between the transmission portion 66 and the female connectors 26 to force the male connectors 24 out of engagement with the female connectors 26. The male connectors 24 are out of engagement with the female connectors 26 when first end surfaces 24a are on a side of a radially extending surface 72 of second clutch section 22. Radially extending surface 72 extends from outer circumferential surface 63a to receptacles 27 and outer circumferential surface 22a.

The transmission portion 66 includes a plurality of receptacles 70, as shown in FIGS. 3 and 5. Each of the receptacles 70 defines the outer circumference 64a of one of the transmission bores 64. Each of the receptacles 70 has a semi-cylindrical shape and each of the female connectors 26 has a semi-cylindrical shape, as shown in FIGS. 3 and 5.

As shown in FIGS. 4a, 4b and 5, bearing 74 and bearing 76 are provided for mounting second sleeve 40 for rotation with respect to housing 60 and second clutch section 22.

A method of constructing sway bar disconnect assembly 10 includes non-rotatably connecting first bar segment 12 to first clutch section 20 and non-rotatably connecting second bar segment 16 to second clutch section 22. The method also includes providing axially movable disconnector 28 on outer circumferential surface 22a of the second clutch section 22 in axial alignment with male connectors 24 of first clutch section 20. The method further includes connecting actuator 38 to disconnector 28 so the actuator 38 is arranged and configured for axially moving the disconnector 28 to force the male connectors 24 out of engagement with female connectors 26 of the second clutch section 22 causing the disconnect clutch 18 to enter into the disconnect orientation.

In the preceding specification, the present disclosure has been described with reference to specific exemplary embodiments and examples thereof. It will, however, be evident that various modifications and changes may be made thereto without departing from the broader spirit and scope of present disclosure as set forth in the claims that follow. The specification and drawings are accordingly to be regarded in an illustrative manner rather than a restrictive sense.

LIST OF REFERENCE CHARACTERS 10 sway bar disconnect assembly
12 first bar segment
12a first end section
12b second end section
12c two respective bends
12d two respective bends
14a first wheel
14b second wheel
16 second bar segment
16a first end section
16b second end section
16c two respective bends
16d two respective bends
18 disconnect clutch
20 first clutch section
20a inner circumferential surface
20b outer circumferential surface
22 second clutch section
22a outer circumferential surface
23 first axis
24 male connectors
24a first end surface
24b first end
24c second end surface
24d second end 25 pins
26 female connectors
27 receptacles
28 disconnector
30 first sleeve
32 screw
34 first helical groove
36 balls
38 actuator
40 second sleeve
40a teeth
41 second helical groove
42 electric motor
42a connection port
44a first gear
44b second gear
46 bores
48 springs
50 first flange plate
51 second flange plate
52 fasteners
53 fasteners
56 output shaft
58 second axis
60 housing
61 bearing
62 bearing
63 end section
63a outer circumferential surface
64 transmission bores
64a outer circumference
64b inner circumference
66 transmission portion
68 annular space
70 receptacles
72 radially extending surface
74 bearing
76 bearing

What is claimed is:

1. A sway bar disconnect assembly for a motor vehicle comprising:
  a first bar segment for being connected to a first wheel;
  a second bar segment for being connected to a second wheel; and
  a disconnect clutch configured for being selectively movable between a connect orientation in which the disconnect clutch non-rotatably fixes the first bar segment and the second bar segment together and a disconnect orientation in which the disconnect clutch rotationally decouples the first bar segment and the second bar segment from each other,
  the disconnect clutch comprising:
    a first clutch section non-rotatably fixed to the first bar segment, the first clutch section including axially displaceable male connectors;
    a second clutch section non-rotatably fixed to the second bar segment, the second clutch section including female connectors shaped for receiving the male connectors in the connect orientation;
    an axially movable disconnector configured for axially contacting the male connectors; and
    an actuator configured for axially moving the disconnector to force the male connectors out of engagement with the female connectors causing the disconnect clutch to enter into the disconnect orientation;
  wherein the first clutch section includes a plurality of bores, each of the bores including a spring and a respective one of the male connectors, each spring biasing the respective male connector toward the disconnector,
  wherein a first end of the disconnector contacts a first end of each of the male connectors, the first end of each of the male connectors being radially wider than the first end of the disconnector.

2. The sway bar disconnect assembly as recited in claim 1, wherein the female connectors include receptacles intersecting an outer circumferential surface of the second clutch section.

3. The sway bar disconnect assembly as recited in claim 1, wherein the disconnector is slidable along an outer circumferential surface of the second clutch section.

4. The sway bar disconnect assembly as recited in claim 1, wherein the disconnector is a first sleeve of a screw including a first helical groove for receiving balls of the screw.

5. The sway bar disconnect assembly as recited in claim 4, wherein the actuator includes a second sleeve of the screw including a second helical groove for receiving the balls of the screw, the balls being between the first sleeve and the second sleeve.

6. The sway bar disconnect assembly as recited in claim 5, wherein the actuator includes an electric motor for driving the second sleeve to move the first sleeve axially, the second sleeve being fixed axially in place, the electric motor configured for rotating the second sleeve in a first rotational direction to move the first sleeve toward the male connectors and for rotating the second sleeve in a second rotational direction to move the first sleeve away from the male connectors.

7. The sway bar disconnect assembly as recited in claim 1, wherein the male connectors are pins and the female connectors are receptacles defining slots for receiving the male connectors.

8. The sway bar disconnect assembly as recited in claim 1, wherein the actuator is configured for axially moving the disconnector in a first axial direction to force the male connectors into the respective springs to compress the springs, and configured for moving the disconnector in a second axial direction opposite of the first axial direction such that the springs expand to force ends of the male connectors out of the bores.

9. The sway bar disconnect assembly as recited in claim 8, wherein the first bar segment includes a first flange plate fixed to an end thereof, the first flange plate being fixed to the first clutch section, the springs abutting the first flange plate and being sandwiched axially between the first flange plate and the male connectors.

10. The sway bar disconnect assembly as recited in claim 1,
  wherein the first clutch section and the second clutch section are rotatable about a first axis, the actuator including an electric motor having an output shaft that is rotatable about a second axis, the second axis being radially offset from and parallel with the first axis,
  the sway bar disconnect assembly further comprising a housing radially enclosing the first clutch section, the second clutch section, the disconnector and at least a portion of the electric motor,
  wherein the first bar segment includes a first flange plate fixed to an end thereof and the second bar segment includes a second flange plate fixed to an end thereof, the first flange plate being fixed to the first clutch section, the second flange plate being fixed to the second clutch section, the first bar segment being rotatable with respect to the housing about the first axis.

11. The sway bar disconnect assembly as recited in claim 1, wherein the disconnect clutch includes a bearing on an inner circumferential surface of the first clutch section, an end section of the second bar segment being supported inside the bearing for rotatably supporting the second bar segment with respect to the first bar segment.

12. The sway bar disconnect assembly as recited in claim 1, wherein the male connectors non-rotatably connect the first clutch section and the second clutch section together when a first end of each of the male connectors is in a respective transmission bore, each transmission bore being defined by a transmission portion of the first clutch section and one of the female connectors, the transmission portion defining an outer circumference of each of the transmission bores, each of the female connectors defining an inner circumference of each of the transmission bores.

13. The sway bar disconnect assembly as recited in claim 12, wherein the disconnect clutch is configured such that the disconnector enters an annular space radially between the transmission portion and the female connectors to force the male connectors out of engagement with the female connectors.

14. The sway bar disconnect assembly as recited in claim 12, wherein the transmission portion includes a plurality of receptacles, each of the receptacles defining the outer circumference of one of the transmission bores.

15. The sway bar disconnect assembly as recited in claim 14, wherein each of the receptacles has a semi-cylindrical shape and each of the female connectors has a semi-cylindrical shape.

16. The sway bar disconnect assembly as recited in claim 1, wherein each of the male connectors is axially between the spring and the disconnector.

17. A method of constructing a sway bar disconnect assembly for a motor vehicle comprising:
non-rotatably connecting a first bar segment to a first clutch section of a disconnect clutch, the first bar segment configured for being connected to a first wheel of the motor vehicle;
non-rotatably connecting a second bar segment to a second clutch section of the disconnect clutch, the second bar segment configured for being connected to a second wheel of the motor vehicle, the disconnect clutch configured for being selectively movable between a connect orientation in which the disconnect clutch non-rotatably fixes the first bar segment and the second bar segment together and a disconnect orientation in which the disconnect clutch rotationally decouples the first bar segment and the second bar segment from each other;
placing each of a plurality of springs into a respective one of a plurality of bores in the first clutch section, and then placing each of a plurality of male connectors into a respective one of the plurality of bores;
providing an axially movable disconnector on an outer circumferential surface of the second clutch section in axial alignment with and in contact with the male connectors each spring forcing the male connector into the disconnector; and
connecting an actuator to the disconnector, the actuator configured for axially moving the disconnector to force the male connectors out of engagement with female connectors of the second clutch section causing the disconnect clutch to enter into the disconnect orientation,
each of the male connectors including a first axial end and a second axial end opposite of the first axial end, each of the male connectors being entirely received in the respective bore in the disconnect orientation such that both the first axial end and the second axial end of each male connector are entirely received in the respective bore in the disconnect orientation.

18. A sway bar disconnect assembly for a motor vehicle comprising:
a first bar segment for being connected to a first wheel;
a second bar segment for being connected to a second wheel; and
a disconnect clutch configured for being selectively movable between a connect orientation in which the disconnect clutch non-rotatably fixes the first bar segment and the second bar segment together and a disconnect orientation in which the disconnect clutch rotationally decouples the first bar segment and the second bar segment from each other,
the disconnect clutch comprising:
a first clutch section non-rotatably fixed to the first bar segment, the first clutch section including axially displaceable male connectors;
a second clutch section non-rotatably fixed to the second bar segment, the second clutch section including female connectors each receiving a first end of a respective one of the male connectors in the connect orientation;
an axially movable disconnector configured for directly axially contacting the first end of each of the male connectors so that the first end of each of the male connectors that is penetrating the respective female connector is also engaged by the disconnector to enter into the disconnect orientation; and
an actuator configured for axially moving the disconnector to force the male connectors out of engagement with the female connectors causing the disconnect clutch to enter into the disconnect orientation.

19. The sway bar disconnect assembly as recited in claim 18, wherein each of the male connectors includes a second end contacting at least one spring.

20. The sway bar disconnect assembly as recited in claim 19, wherein each of the male connectors is axially between the spring and the disconnector.

* * * * *